(12) United States Patent
Webb et al.

(10) Patent No.: US 8,453,824 B2
(45) Date of Patent: Jun. 4, 2013

(54) CONNECTION ARRANGEMENTS FOR MINE CONVEYOR SECTIONS

(75) Inventors: Phillip A. Webb, Abingdon, VA (US); Michael R. Walker, Bristol, VA (US)

(73) Assignee: American Highwall Systems, Inc., Chilhowie, VA (US)

( * ) Notice: Subject to any disclaimer, the term of this patent is extended or adjusted under 35 U.S.C. 154(b) by 0 days.

(21) Appl. No.: 13/316,843

(22) Filed: Dec. 12, 2011

(65) Prior Publication Data

US 2012/0080293 A1 Apr. 5, 2012

Related U.S. Application Data

(60) Continuation of application No. 13/031,470, filed on Feb. 21, 2011, now Pat. No. 8,074,792, which is a division of application No. 12/238,608, filed on Sep. 26, 2008.

(60) Provisional application No. 60/975,895, filed on Sep. 28, 2007.

(51) Int. Cl.
*B65G 21/10* (2006.01)

(52) U.S. Cl.
USPC .............................. 198/584; 403/53; 193/2 A

(58) Field of Classification Search
USPC . 198/860.2, 861.2, 861.3, 583, 584; 193/2 A; 403/49, 61, 323, 53
See application file for complete search history.

(56) References Cited

U.S. PATENT DOCUMENTS

| | | | | | |
|---|---|---|---|---|---|
| 2,590,802 | A | * | 3/1952 | Tramblay | 198/735.6 |
| 2,828,851 | A | * | 4/1958 | Thomas | 198/729 |
| 3,134,480 | A | * | 5/1964 | Loosli | 198/861.3 |
| 3,300,031 | A | * | 1/1967 | Dommann et al. | 198/861.2 |
| 3,481,095 | A | * | 12/1969 | Beziat | 52/638 |
| 3,583,552 | A | * | 6/1971 | Renwick | 198/735.6 |
| 3,641,598 | A | * | 2/1972 | Feldstein | 5/100 |
| 3,680,682 | A | * | 8/1972 | Paul | 198/861.2 |
| 3,762,532 | A | * | 10/1973 | Nelson | 198/309 |
| 3,788,458 | A | * | 1/1974 | Braun et al. | 198/735.2 |
| 3,796,296 | A | * | 3/1974 | Bakker | 198/735.6 |
| 3,822,011 | A | * | 7/1974 | Braun et al. | 198/735.2 |
| 3,828,916 | A | * | 8/1974 | Patz | 198/735.5 |
| 3,841,464 | A | * | 10/1974 | Tome | 198/861.2 |
| 3,944,061 | A | * | 3/1976 | Braun et al. | 198/735.2 |
| 3,946,860 | A | * | 3/1976 | Krohm et al. | 198/735.6 |
| 3,999,651 | A | * | 12/1976 | Steinkuhl | 198/735.6 |
| 4,008,797 | A | * | 2/1977 | Nelson | 198/313 |
| 4,014,574 | A | * | 3/1977 | Todd | 299/1.4 |
| 4,098,396 | A | * | 7/1978 | Stoppani et al. | 198/735.6 |
| 4,133,424 | A | * | 1/1979 | Sabes | 198/735.6 |

(Continued)

*Primary Examiner* — Joseph A Dillon, Jr.
(74) *Attorney, Agent, or Firm* — King & Schickli, PLLC

(57) ABSTRACT

Arrangements are for use with interconnected conveyor sections, such as push beams, commonly found in mining applications. In one embodiment, a mechanism includes an elongated dog-bone shaped coupler having a first and second end for insertion between the conveyor sections. A first end of the coupler is secured to a first conveyor section, while a second end of the coupler is received in a recess formed in a second conveyor section. A pivotally mounted cam includes a recess for mating with the upwardly projecting, flared portion of the second end of the coupler. The cam pivots automatically upon being engaged by a free end of the coupler to allow it to pass and then pivots to capture it in place, thereby simply establishing a secure manner of connection. In another, the ends of the conveyor sections are specially adapted to form an articulating joint.

33 Claims, 5 Drawing Sheets

U.S. PATENT DOCUMENTS

| | | | | |
|---|---|---|---|---|
| 4,134,489 | A * | 1/1979 | Sabes | 198/735.6 |
| 4,142,812 | A * | 3/1979 | Steinkuhl | 198/735.6 |
| 4,278,294 | A * | 7/1981 | Braun | 299/34.1 |
| 4,307,802 | A * | 12/1981 | Linder | 198/735.2 |
| 4,355,917 | A * | 10/1982 | Bunger | 403/24 |
| 4,420,075 | A * | 12/1983 | Skolik et al. | 198/735.2 |
| 4,444,304 | A * | 4/1984 | Redder et al. | 198/735.2 |
| 4,479,575 | A * | 10/1984 | Grundken et al. | 198/735.2 |
| 4,538,722 | A * | 9/1985 | Sumner | 198/861.2 |
| 4,560,059 | A * | 12/1985 | Braun et al. | 198/735.2 |
| 4,586,842 | A * | 5/1986 | Puccinelli | 403/246 |
| 4,588,072 | A * | 5/1986 | Braun et al. | 198/735.6 |
| 4,607,890 | A * | 8/1986 | Merten et al. | 299/43 |
| 4,646,905 | A * | 3/1987 | Grundken et al. | 198/735.6 |
| 4,700,827 | A * | 10/1987 | Haaser | 198/771 |
| 4,727,981 | A * | 3/1988 | Johansson | 198/841 |
| 4,733,771 | A * | 3/1988 | Grundken et al. | 198/735.6 |
| 4,813,747 | A * | 3/1989 | Klimeck et al. | 299/43 |
| 5,096,045 | A * | 3/1992 | Feldl | 198/583 |
| 5,161,858 | A * | 11/1992 | Braun et al. | 299/43 |
| 5,184,873 | A * | 2/1993 | Fiesel | 299/43 |
| 5,224,582 | A * | 7/1993 | Hahn et al. | 198/735.6 |
| 5,287,955 | A * | 2/1994 | Steinkuhl et al. | 198/735.6 |
| 5,463,912 | A * | 11/1995 | Inoue et al. | 74/519 |
| 5,658,085 | A * | 8/1997 | Merten et al. | 403/315 |
| 5,848,825 | A * | 12/1998 | Antoline et al. | 299/18 |
| 5,875,883 | A * | 3/1999 | Ertel et al. | 198/821 |
| 5,927,476 | A * | 7/1999 | Merten et al. | 198/735.6 |
| 5,938,289 | A * | 8/1999 | Antoline et al. | 299/67 |
| 5,961,245 | A * | 10/1999 | Garin et al. | 403/322.1 |
| 6,035,997 | A * | 3/2000 | Heninger et al. | 198/735.2 |
| 6,042,191 | A * | 3/2000 | Antoline et al. | 299/67 |
| 6,135,665 | A * | 10/2000 | Alfieri et al. | 403/61 |
| 6,371,683 | B1 * | 4/2002 | Draney et al. | 403/325 |
| 6,409,011 | B1 * | 6/2002 | Ferguson | 198/861.3 |
| 6,595,561 | B1 * | 7/2003 | Szablewski et al. | 292/304 |
| 6,708,814 | B2 * | 3/2004 | Wagstaffe | 198/632 |
| 6,799,675 | B2 * | 10/2004 | Wirtz et al. | 198/735.2 |
| 6,843,364 | B2 * | 1/2005 | Schmidt et al. | 198/735.1 |
| 7,491,007 | B2 * | 2/2009 | Burrows | 403/324 |
| 7,562,764 | B2 * | 7/2009 | Schmidt et al. | 198/735.6 |
| 7,752,730 | B2 * | 7/2010 | Caveney et al. | 29/450 |

\* cited by examiner

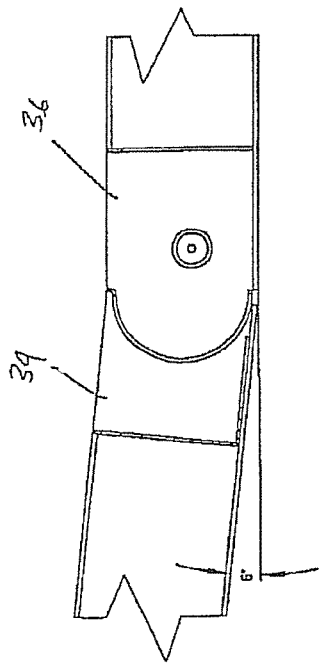
*Fig. 6a*
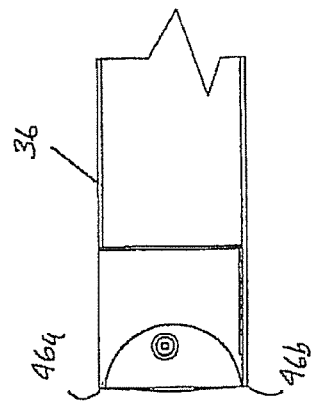
*Fig. 5*
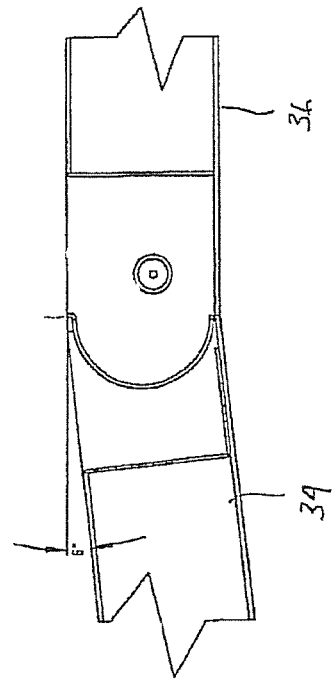
*Fig. 6b*
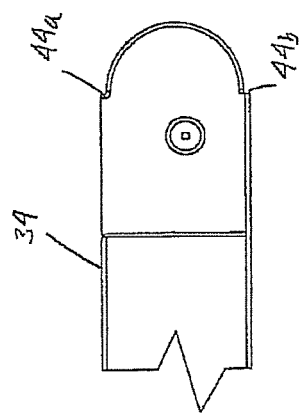

CONNECTION ARRANGEMENTS FOR MINE CONVEYOR SECTIONS

This application is a continuation of Ser. No. 13/031,470, filed Feb. 21, 2011, now U.S. Pat. No. 8,074,792 which is a divisional of U.S. patent application Ser. No. 12/238,608, filed Sep. 26, 2008, of which the present application is also a continuation, and which claims the benefit of U.S. Provisional Patent Application Ser. No. 60/975,895, filed Sep. 28, 2007, the disclosures of which are all incorporated herein by this reference.

TECHNICAL FIELD

The present invention relates generally to the mining arts and, more particularly, to improved arrangements for coupling adjacent mine conveyor sections.

BACKGROUND OF THE INVENTION

Highwall mining is a form of surface mining, in which spaced apart tunnels (sometimes called holes or entries) are cut into an exposed face of the seam at predetermined intervals to create the pillars for supporting the overburden. A typical highwall mining system is comprised of a cutter (or miner module), a conveying system and a main miner (or launch module). The cutter cuts into a mineral seam and is forced into the cut by pushing a series of conveyor sections, also called "push beams" or "conveyor pans."

It is common in the art of highwall mining to use push beams to form a part of a highwall mining system. Generally, push beams are essentially boxes that contain a type of conveying mechanism, such as augers, that move the minerals out of the mine. The basic approach is shown and described in U.S. Pat. No. 4,014,574 to Todd.

To provide an efficient and effective highwall mining system, the push beams must interconnect in such a way as to withstand the substantial forces present during a typical mining operation. Specifically, the push beams must be rigid in the horizontal plane to prevent the cutter from going off target and breaking through into the last cut. This is normally accomplished by interconnecting the push beams together using "dog-bone" couplers that were retained using separate removable pins as shown in U.S. Pat. No. 6,035,997 to Heninger et al. or like mechanisms, such as nut and bolt combinations.

Although removable pins or like mechanisms may be used to retain the dog-bone shaped couplers interconnecting the push beams, limitations remain. Specifically, in the harsh conditions often encountered in the mining operation, these types of arrangements are susceptible to becoming damaged. Further, the removable pins or like mechanisms are easily lost or misplaced, which is troublesome to the mining operation for obvious reasons, such as cost and delay.

Past push beams used in highwall miners are also typically interconnected with abutting vertical faces such that relative articulation was not possible (or was only possible to a very limited extent, such as the result of part tolerances). Even when such limited articulation was possible, the abutting ends of the push beams were generally square and thus prevented any articulation when under compressive loading (see the '574 patent to Todd; col. 14, line 68 to col. 15, line 1, which states that the gap between the push beam couplers "allows for a slight flexing movement between the modules . . . when they are not under a longitudinal compressive load.") (emphasis added). This inability to freely articulate, especially during the application of a longitudinal compressive load, may create a significant problem when the entry is uneven or undulating, since the push beams may "bind up" and become stuck.

Accordingly, the art of mining has a need for an improved arrangements for coupling conveyor sections. Specifically, a need exists for improved latching mechanisms for interconnecting the conveyor sections that minimizes damage in harsh mining conditions and reduces costs and delays due to lost or misplaced parts. A further need exists for a coupling that permits adjacent conveyor sections to articulate in a smooth and controlled manner.

SUMMARY OF THE INVENTION

The above-mentioned and other problems become solved by applying the principles and teachings associated with the hereinafter described latching mechanisms. In accordance with one aspect, a latching mechanism for interconnecting a plurality of adjacent conveyor sections includes a pivotally mounted coupler. The coupler has a first, apertured end, a second end and an elongated shank connecting the first end and the second end. In the most preferred embodiment, the coupler is of the "dog bone" style, having an elongated connector between oversized ends.

The first end of the coupler is positioned in a coupler receiver attached to a first conveyor section. A retainer pin extends perpendicular to the coupler and through the aperture in the first end. The first end of the coupler is firmly held into place by the coupler pin in connection with a retainer and fasteners, such as for example a pair of screws. In the usual course, the first end of the coupler remains attached to the first push beam throughout the entire mining operation.

The second end of the coupler extends in the conveying direction and is received in an opening formed in a receiver attached to a second conveyor section. This receiver at least supports a cam for pivoting movement about a retainer pin. The cam has a recess for mating with the upwardly projecting, flared portion of the second end of the coupler. The cam pivots automatically upon being engaged by the second end of the coupler to allow it to pass through whereby the cam recess engages the flared portion and becomes captured. Tensile force then applied to the coupler in the opposite direction causes the cam to pivot counterclockwise about the retainer pin, thereby ensuring a secure connection is formed.

Another aspect of the invention is providing the conveyor sections with mating male and female ends apart from the couplers used to form the connection between them. In particular, a first end of a first conveyor, such as a tubular push beam using in highwall mining systems, includes a pair of non-linear (preferably arcuate and, most preferably, semi-circular) projections on the sidewalls for mating with corresponding receivers formed in the opposing ends of the sidewalls of the adjacent conveyor section, or push beam. As a result of the joint formed by the projections and receivers when mated, the conveyor sections may articulate relative to each other a limited, predetermined amount, as defined by the engagement between the ends of the receivers of one section and the mating ends of the other section. This limited articulation helps to prevent the push beams from binding up in the entry without having any significant negative impact on the ability to supply the compressive force in the longitudinal direction that may be necessary to effect movement during the mining operation. Articulation is also accomplished without any interference from conveyor components (e.g., augers) contained in the push beams, since they do not project from the ends of the push beam(s).

These and other embodiments, aspects, advantages and features will be set forth in the description which follows, and in part will become apparent to those of ordinary skill in the art by reference to the following description of exemplary embodiments of the invention and referenced drawings or by practice of the invention. The aspects, advantages and features are realized and attained according to the following description and as particularly pointed out in the appended claims.

BRIEF DESCRIPTION OF THE DRAWINGS

The accompanying drawings incorporated in and forming a part of the specification, illustrate several aspects described herein and, together with the description, serves to explain the principles of the invention. In the drawings:

FIG. 5 is an partially cutaway exploded side view of the conveyor sections of FIG. 4; and FIGS. 6a and 6b are side, partially cutaway views illustrating the manner in which the conveyor sections of FIG. 4 may articulate when juxtaposed.

DETAILED DESCRIPTION OF THE INVENTION

In the following detailed description of the drawings, reference is made to the accompanying drawings that form a part hereof, and in which is shown by way of illustration, specific embodiments in which the disclosed innovations may be practiced. These embodiments are described in sufficient detail to enable those skilled in the art to understand and like numerals represent like details in the various figures. Also, it is to be understood that other embodiments may be utilized and that changes may be made without departing from the scope of the invention. The following detailed description is, therefore, not to be taken in a limiting sense, and the scope of coverage is defined only by the appended claims and their equivalents.

Figure 1:
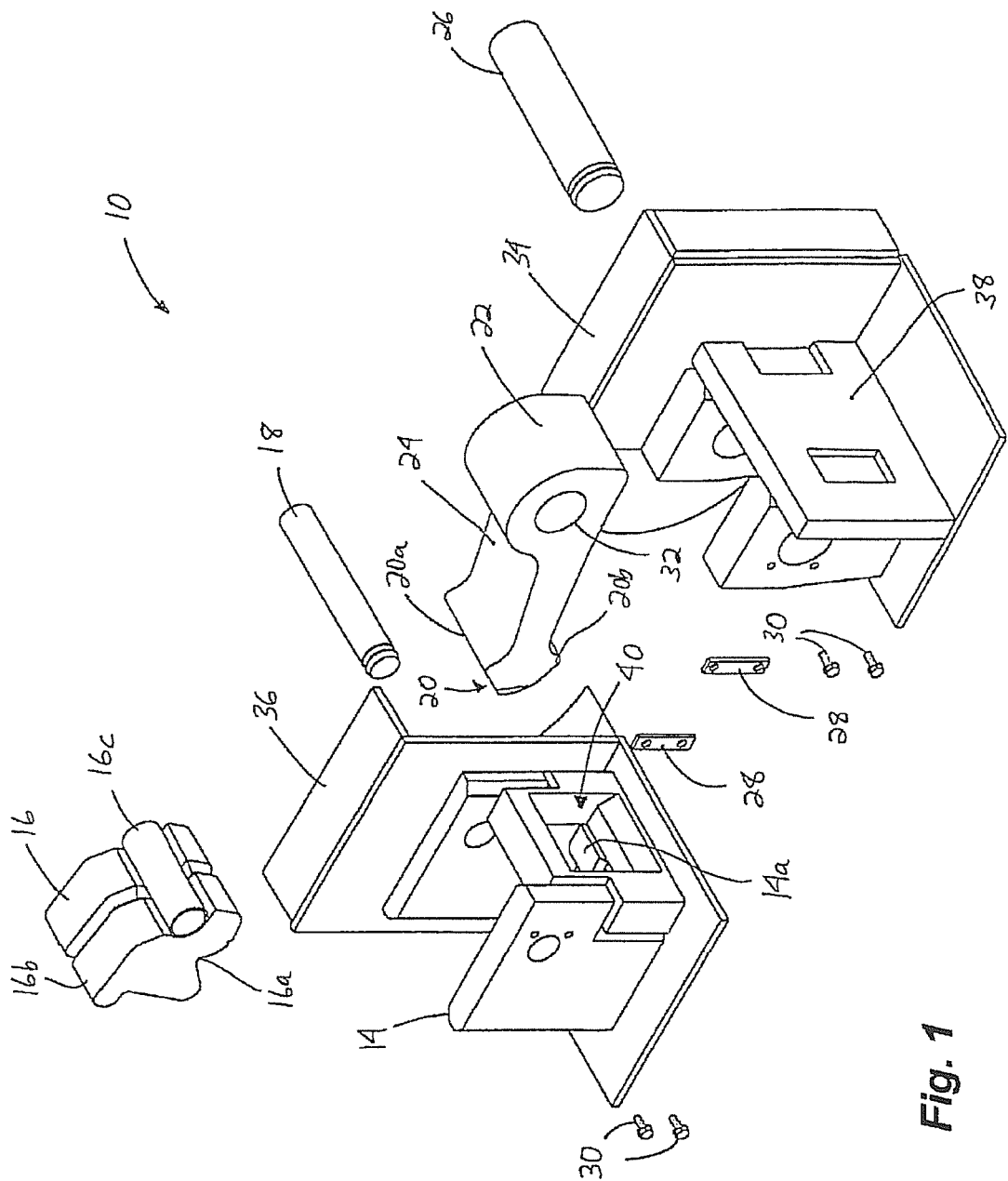
FIG. 1 is a exploded view of one embodiment of a proposed latching mechanism forming one aspect of the invention.

Reference is now made to FIG. 1, which illustrates in exploded form an improved latching mechanism 10 for interconnecting conveyor sections used in a mining system, such as a highwall mining system. The mechanism 10 is comprised of a pivotally mounted coupler 12 for interconnecting a first conveyor section, such as push beam 34, and a second conveyor section, such as push beam 36. The coupler 12 is generally of the "dog-bone" type, having a first oversized end 22, a oversized second end 20 and an elongated shank 24 connecting the two ends.

One of the conveyor sections, such as the first push beam 34, includes a first receiver 38 for receiving the first end 22 of the coupler 12. In the illustrated embodiment, the first end 22 of the coupler 12 includes an enlarged semi-circular profile with a hole 32 within a middle portion thereof. A pin 26 is positioned transverse to the conveying direction and perpendicular to the coupler 12 and extends through the hole 32. The first end 22 of the coupler 12 may be firmly held into place by the pin 26 in connection with a retainer 28 for associating with a peripheral notch therein and a pair of fasteners 30, and remains securely held within the receiver 38 throughout the mining operation to thereby substantially eliminate the risk of loss.

The second end 20 of the coupler 12 includes a projection 20a, which is preferably created by an upwardly flared portion 20a. An opposing projection 20b may also be provided by a downwardly flared portion 20b. Together, the opposing flared portions 20a, 20b provide the second end 20 of the coupler 12 with an "arrow" shape.

In use, the second end 20 of the coupler 12 is received in an opening 40 of a second receiver 14. In turn, this second receiver 14 receives a cam 16 capable of pivoting about a connector, such as pivot pin 18 (which may also include a peripheral notch for engaging a retainer 28 associated with fasteners 30 for attachment to the sidewall of the second receiver 14). The cam 16 includes a recess 16a adapted for mating with the upwardly projecting or flared portion of the second, head end 20 of the coupler 12, as well as a receiver 16c for receiving the pivot pin 18. The cam receiver 14 further contains a transversely projecting lip 14a generally opposite the cam 16 for engaging the downwardly flared portion of the head end 20 of the coupler 20.

When the conveyor sections, or push beams 34, 36, move into alignment and engagement, the second end 20 of the coupler 12 registers with the opening 40 of the cam receiver 14. Initially, the engagement with the second end 20 of the coupler 12 pivots the cam 16 upwardly to facilitate forward movement into the engaged position. When the second end 20 of the coupler 12 is then more fully inserted into the cam receiver 14, the cam 16 pivots back and automatically connects with the arrow-shaped second end 20 of the coupler 12 with the recess 16a (see FIG. 3a). This also tends to urge the coupler 12 downwardly such that engagement between the lower projection, or flared portion 20b, and the lip 14a, is maintained.

As a result of this interlocking arrangement, any significant tensile force applied to the coupler 12 in a direction opposite from the insertion direction (see action arrow T), such as the result of the corresponding ends of the conveyor sections or beams 34, 36 moving apart, causes the cam 16 to pivot counterclockwise about the pin 18. Essentially, this tightens the engagement and ensures that a secure connection is maintained at all times. Preferably, the positioning is such that the cam 16 cannot be rotated clockwise to any significant degree by the coupler 12, since the ends of the beams 34, 36 will eventually abut and stop any forward movement of the second end 20 (i.e, opposite the direction of arrow T).

Despite the secure nature of the connection thus formed, it is easily released when decoupling the conveyor sections is desired. Specifically, the coupler 12 may be released by engaging an upper projection 16b of the cam 16 and pivoting it about the retainer pin 18 in the clockwise direction (see action arrow R in FIG. 3b). Preferably, this step may be completed manually using finger action applied to the projection 16b until it is removed from engagement and the coupler 12 may be withdrawn. No parts are removed during this sequence, including the coupler 12 (which at all times remains attached to one of the push beams 34, 36), and no tools are required.

With reference to FIGS. 4, 5, and 6a-6b, a further, potentially related aspect of this disclosure involves providing articulated mine conveyor sections, such as push beams 34, 36 for use in highwall mining applications. Specifically, one end of a first push beam 34 includes non-linear projections 40a, 40b integrally formed in the spaced sidewalls thereof that mate with matching receivers 42a, 42b formed in the sidewalls at the corresponding end of the second push beam 36. Preferably, the projections 40a, 40b and receivers 42a, 42b are arcuate and, most preferably, semi-circular or generally C-shaped. Matching abutments 44a, 44b are provided on the first push beam 34 for receiving the end faces 46a, 46b of the adjacent or second push beam 36.

Couplers, such as the dogbone-style couplers 12 described above, are provided for interconnecting the first and second push beams 34, 36. When in this position, it should be appreciated that the push beams 34, 36 may undergo a relative degree of articulation along the joint thus formed, possibly with sliding engagement between the projections 40a, 40b and the receivers 42a, 42b. Specifically, as shown in FIG. 6a or 6b, the first push beam 34 may articulate in a vertical direction (e.g., up or down) a predetermined amount (e.g., six degrees) as a result of this joint, even when under compression during advancement or otherwise.

Figure 2:
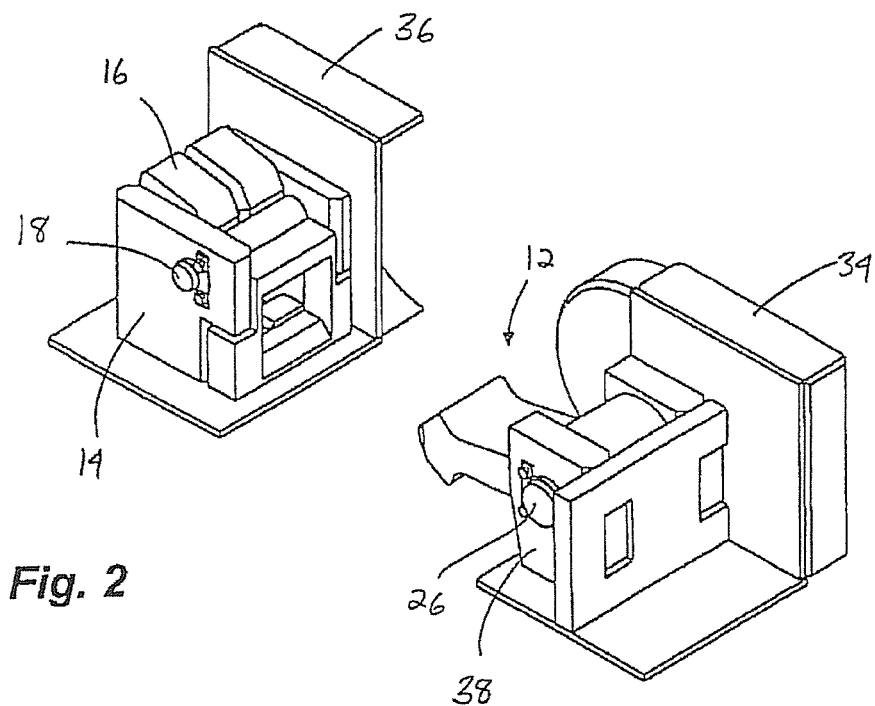
FIG. 2 is a perspective view of the latching mechanism of FIG. 1 in the unlatched condition.
Figure 3:
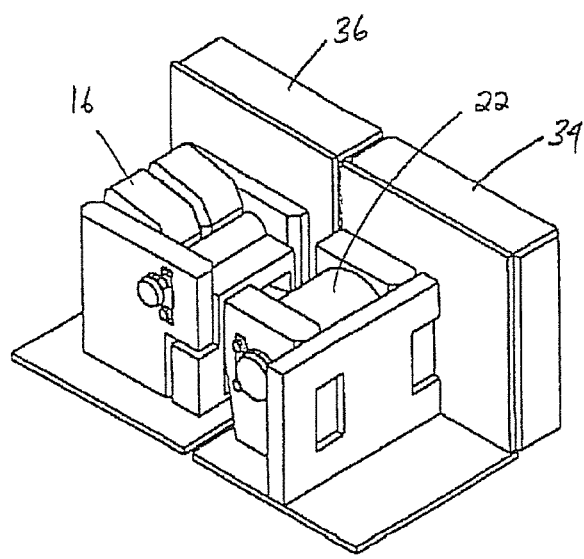
FIG. 3 is a perspective view of the latching mechanism in a latched condition.
Figure 3A:
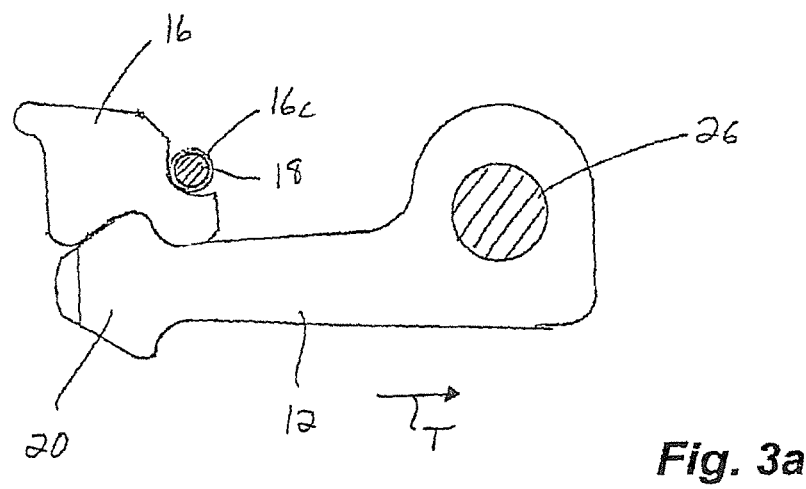
FIG. 3a is a side schematic view showing the coupler interfacing with the cam.
Figure 3B:
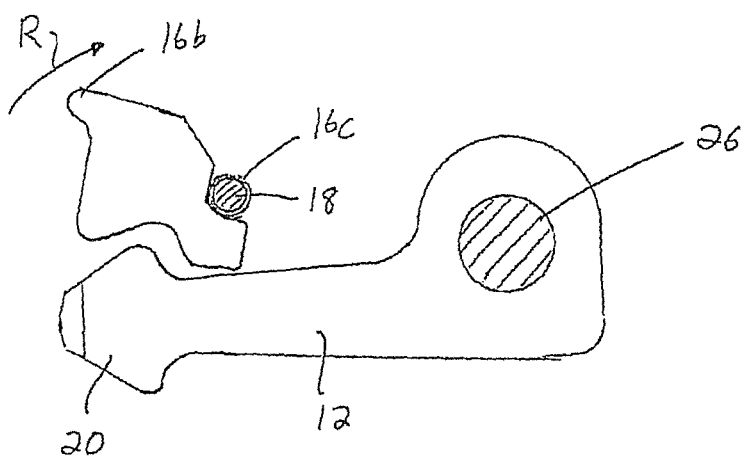
FIG. 3b is a side schematic view illustrating the movement of the cam toward the release position.
Figure 4:
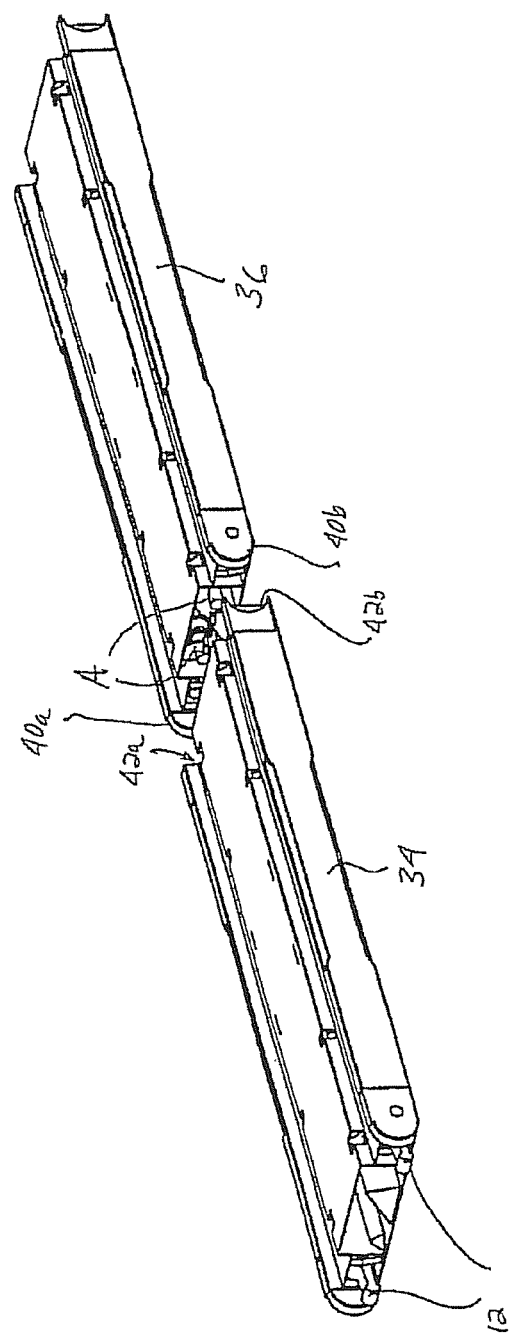
FIG. 4 is a perspective view of a pair of adjacent conveyor sections adapted to form an articulating joint when coupled.

This arrangement helps to reduce or even eliminate the incidence of binding, advantageously without having any significant negative impact on the ability to supply the compressive force in the longitudinal direction necessary to effect movement during mining. As should be understood, combined use of the pivoting coupler 12 as shown in FIGS. 1-3 is especially beneficial, in that it does not in any way restrain the articulation. Moreover, the augers A used to convey the mined coal are also fully contained within each tubular push beam 34, 36, and thus do not project from it and create any interference.

The foregoing description of a preferred embodiment of the invention has been presented for purposes of illustration and description. It is not intended to be exhaustive or to limit the invention to the precise form disclosed. Obvious modifications or variations are possible in light of the above teachings. For instance, while the inventions are described for particular use in connection with highwall mining systems, they may find utility in other mining systems incorporating sectional conveyors that must be interconnected and/or moved about the mine. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A mine conveyor section assembly for defining a conveyor path in a conveying direction, comprising:
    a first conveyor section having sidewalls including a pair of projections having a non-linear profile;
    a second conveyor section including matching recesses for receiving each of the projecting ends of the, first conveyor section; and
    a pivotally mounted coupler for interconnecting the first and second sections, said coupler including a first end for connecting with the first conveyor section and a second end for connecting with the second conveyor section, the second end having an outwardly flared projection;
    a connector for connecting the first end of the coupler to the first conveyor section; and
    a pivotally mounted cam associated with the second conveyor section, the cam including a recess adapted for engaging the projection of the coupler to connect the coupler to the second conveyor section;
    whereby the projections and matching recesses when mated form a joint that permits relative articulation of the conveyor sections.

2. The assembly of claim 1, wherein the projections are arcuate.

3. The assembly of claim 1, wherein the projections are semi-circular.

4. The assembly of claim 1, wherein the first end of the coupler includes an aperture.

5. The assembly of claim 1, wherein the connector comprises a pin extending through the aperture and supported by the first conveyor section.

6. The assembly of claim 1, wherein the cam is positioned above an opening for receiving the head end of the coupler.

7. The assembly of claim 1, wherein the coupler is pivotally mounted to the first conveyor section.

8. A mine conveyor section assembly for defining a conveyor path in a conveying direction, comprising:
    a first conveyor section including a pivotally mounted coupler having a first end projecting from the first conveyor section in the conveying direction, and a second end including an aperture;
    a second conveyor section including an opening sized for receiving the first end of the first conveyor section in the conveying direction, the second conveyor section supporting a pivotally mounted cam for automatically pivoting upon engagement with the end of the coupler to capture the coupler and interconnect with the first conveyor section.

9. The assembly of claim 8 further including a connector for connecting the coupler to the first conveyor section, said connector comprising a pin extending through the aperture and supported by the first conveyor section.

10. The assembly of claim 8 wherein the first end of the coupler comprises an outwardly flared projection.

11. The assembly of claim 8 wherein the cam is positioned above an opening for receiving a head end of the coupler.

12. The assembly of claim 8 wherein the coupler is pivotally mounted to the first conveyor section.

13. The mine conveyor section assembly of claim 1, wherein the projecting ends do not overlap with each other.

14. The mine conveyor section assembly of claim 1, wherein the projecting ends extend in the same direction.

15. A mine conveyor section assembly for defining a conveyor path in a conveying direction, comprising:
    a first conveyor section having sidewalls including a pair of projections having a non-linear profile;
    a second conveyor section including matching recesses for receiving each of the projecting ends of the, first conveyor section; and
    a pivotally mounted coupler for interconnecting the first and second sections, said coupler including a first end for connecting with the first conveyor section and a second end for connecting with the second conveyor section, the second end having a projection;
    a connector for connecting the first end of the coupler to the first conveyor section; and
    a pivotally mounted cam associated with the second conveyor section and positioned above an opening for receiving the second end of the coupler, the cam including a recess adapted for engaging the projection of the coupler to connect the coupler to the second conveyor section;

whereby the projections and matching recesses when mated form a joint that permits relative articulation of the conveyor sections.

16. The assembly of claim 15, wherein the projections are arcuate.

17. The assembly of claim 15, wherein the projections are semi-circular.

18. The assembly of claim 15, wherein the first end of the coupler includes an aperture.

19. The assembly of claim 15, wherein the connector comprises a pin extending through the aperture and supported by the first conveyor section.

20. The assembly of claim 15, wherein the projection on the second end of the coupler comprises an outwardly flared projection.

21. The assembly of claim 15, wherein the coupler is pivotally mounted to the first conveyor section.

22. The mine conveyor section assembly of claim 15, wherein the projecting ends do not overlap with each other.

23. The mine conveyor section assembly of claim 15, wherein the projecting ends extend in the same direction.

24. A mine conveyor section assembly for defining a conveyor path in a conveying direction, comprising:
a first conveyor section including a pivotally mounted coupler having a first end projecting from the first conveyor section in the conveying direction, said first end comprising an outwardly flared projection;
a second conveyor section including an opening sized for receiving the end of the first conveyor section in the conveying direction, the second conveyor section supporting a pivotally mounted cam for automatically pivoting upon engagement with the first end of the coupler to capture the coupler and interconnect with the first conveyor section.

25. The assembly of claim 24, wherein a second end of the coupler includes an aperture.

26. The assembly of claim 25 further including a connector for connecting the coupler to the first conveyor section, said connector comprising a pin extending through the aperture and supported by the first conveyor section.

27. The assembly of claim 24 wherein the cam is positioned above an opening for receiving a head end of the coupler.

28. The assembly of claim 24 wherein the coupler is pivotally mounted to the first conveyor section.

29. A mine conveyor section assembly for defining a conveyor path in a conveying direction, comprising:
a first conveyor section including a pivotally mounted coupler having a first end projecting from the first conveyor section in the conveying direction;
a second conveyor section including an opening sized for receiving the first end of the first conveyor section in the conveying direction, the second conveyor section supporting a pivotally mounted cam positioned above an opening for receiving the first end of the coupler, said cam for automatically pivoting upon engagement with the first end of the coupler to capture the coupler and interconnect with the first conveyor section.

30. The assembly of claim 29, wherein a second end of the coupler includes an aperture.

31. The assembly of claim 30, further including a connector for connecting the coupler to the first conveyor section, said connector comprising a pin extending through the aperture and supported by the first conveyor section.

32. The assembly of claim 29, wherein the first end of the coupler comprises an outwardly flared projection.

33. The assembly of claim 29, wherein the coupler is pivotally mounted to the first conveyor section.

* * * * *